US008892178B2

United States Patent
Han

(10) Patent No.: US 8,892,178 B2
(45) Date of Patent: Nov. 18, 2014

(54) SUPPORT BOARD USED IN MOBILE PHONE WITH MAIN BOARD HAVING BROKEN-BOARD STRUCTURE

(75) Inventor: Lei Han, Shenzhen (CN)

(73) Assignee: ZTE Corporation, Shenzhen (CN)

(*) Notice: Subject to any disclaimer, the term of this patent is extended or adjusted under 35 U.S.C. 154(b) by 157 days.

(21) Appl. No.: 13/577,544

(22) PCT Filed: Dec. 9, 2010

(86) PCT No.: PCT/CN2010/079596
§ 371 (c)(1),
(2), (4) Date: Aug. 7, 2012

(87) PCT Pub. No.: WO2012/048496
PCT Pub. Date: Apr. 19, 2012

(65) Prior Publication Data
US 2012/0309457 A1  Dec. 6, 2012

(30) Foreign Application Priority Data

Oct. 13, 2010 (CN) ............. 2010 2 0563693 U

(51) Int. Cl.
| | | |
|---|---|---|
| H04M 1/00 | (2006.01) | |
| H04M 1/02 | (2006.01) | |
| G06F 1/16 | (2006.01) | |
| G06F 1/18 | (2006.01) | |

(52) U.S. Cl.
CPC .......... *H04M 1/0277* (2013.01); *H04M 1/0266* (2013.01); *G06F 1/1626* (2013.01); *G06F 1/1637* (2013.01); *G06F 1/184* (2013.01)
USPC .................. 455/575.1; 455/90.3; 455/566

(58) Field of Classification Search
USPC ............. 455/575.1, 90.3, 550.1, 566, 575.8, 455/556.1
See application file for complete search history.

(56) References Cited

U.S. PATENT DOCUMENTS

| | | | | |
|---|---|---|---|---|
| 5,925,847 A | * | 7/1999 | Rademacher et al. | ........ 174/372 |
| 6,809,933 B2 | * | 10/2004 | Kuchiishi et al. | ............. 361/752 |

(Continued)

FOREIGN PATENT DOCUMENTS

| | | |
|---|---|---|
| CN | 1469614 A | 1/2004 |
| CN | 201114238 Y | 9/2008 |

(Continued)

OTHER PUBLICATIONS

International Search Report in international application No. PCT/CN2010/079596, mailed on Jul. 21, 2011.

(Continued)

*Primary Examiner* — Pablo Tran
(74) *Attorney, Agent, or Firm* — Oppedahl Patent Law Firm LLC

(57) ABSTRACT

A support board used in a mobile phone with a main board having a broken-board structure is provided. The support board mainly includes a mounting frame (1) for fixing a display screen and a support portion for supporting the main board having the broken-board structure. The support board is formed by non-metal material, a foil formed by metal material is provided in a portion of the mounting frame which contacts the display screen surrounded by the mounting frame. The support board formed by non-metal material and the foil formed by metal material form a multi-layer structure. The disclosure reduces the manufacturing cost, and satisfies the design requirements of low cost mobile phones such as bar phones.

7 Claims, 2 Drawing Sheets

(56) References Cited

U.S. PATENT DOCUMENTS

| | | | |
|---|---|---|---|
| 6,965,071 B2* | 11/2005 | Watchko et al. | 174/377 |
| 7,130,185 B2* | 10/2006 | Chen et al. | 361/679.3 |
| 7,236,353 B2* | 6/2007 | Davidson et al. | 361/679.34 |
| 7,486,517 B2* | 2/2009 | Aapro et al. | 361/714 |
| 7,595,983 B2* | 9/2009 | Okuda | 361/679.56 |
| 8,594,755 B1* | 11/2013 | Tages et al. | 455/575.8 |
| 2003/0007333 A1 | 1/2003 | Kuchiishi | |
| 2003/0164918 A1* | 9/2003 | Kela et al. | 349/149 |
| 2005/0270728 A1 | 12/2005 | Chen et al. | |
| 2007/0070589 A1 | 3/2007 | Chen et al. | |
| 2008/0151503 A1 | 6/2008 | Aapro et al. | |
| 2009/0268387 A1 | 10/2009 | Chen | |
| 2012/0287568 A1 | 11/2012 | Chen | |

FOREIGN PATENT DOCUMENTS

| | | |
|---|---|---|
| CN | 101754617 A | 6/2010 |
| EP | 1691593 A1 * | 8/2006 |
| JP | 2010193182 A | 9/2010 |
| WO | 2008031278 A1 | 3/2008 |
| WO | WO 2008031278 A1 * | 3/2008 |

OTHER PUBLICATIONS

English Translation of the Written Opinion of the International Search Authority in international application No. PCT/CN2010/079596, mailed on Jul. 21, 2011.

Supplementary European Search Report in European application No. 10858328.7, mailed on Jan. 24, 2014.

* cited by examiner

SUPPORT BOARD USED IN MOBILE PHONE WITH MAIN BOARD HAVING BROKEN-BOARD STRUCTURE

TECHNICAL FIELD

The disclosure relates to a support board in a mobile phone, particularly to a support board used in a mobile phone with a main board having a broken-board structure.

BACKGROUND

Mobile communication technologies have been changing with the development and progress of science and technology and mobile phone is becoming a necessity in people's daily life. Low cost mobile phone is a major trend in the development of the mobile phone manufacturing industry. With the decrease in the mobile phone cost, mobile phones are becoming cheaper and cheaper to become easily affordable for users in more undeveloped areas, thus the popularization rate of mobile phones is largely increased. Most low cost mobile phones are bar phones, and it is possible to apply a broken-board structure in a main board of a bar phone with the increase of the integration degree of the related mobile phone chip. In other words, with the increase of the integration degree of the related mobile phone chip, different from the previous mobile phone main board which occupies the whole mobile phone area, the current mobile phone main board which applies a broken-board structure only occupies about a half of the whole mobile phone area. A main board having a broken-board structure is applied in a mobile phone to greatly reduce the manufacturing cost of the mobile phone. Generally, a support board for supporting the main board and components such as a display screen at the other end are required for a mobile phone which applies a main board having a broken-board structure. Since the support board used by the bar phone in the existing technology is only applicable to a main board with a relatively low chip integration degree, i.e., a main board of a mobile phone needs to occupy the total area of the mobile phone, the support board is not applicable to the mobile phone which applies the main board having the broken-board structure. In addition, the support board is high in cost and fails to completely satisfy the requirements of the low cost mobile phone. Therefore, a support board applied to a main board having a broken-board structure is needed urgently at present.

SUMMARY

In view of this, the main purpose of the disclosure is to provide a support board used in a mobile phone with a main board having a broken-board structure. Applying the support board, the manufacturing cost of the mobile phone can be reduced and the design requirements of low cost mobile phones such as bar phones can be satisfied.

To achieve the purpose above, the technical solution of the disclosure is realized as follows.

A support board used in a mobile phone with a main board having a broken-board structure, wherein the support board comprises a mounting frame for fixing a display screen and a support portion for supporting the main board having the broken-board structure;

wherein the support board is formed by non-metal material;

wherein a foil formed by metal material is provided in a portion of the mounting frame which contacts the display screen surrounded by the mounting frame;

wherein the support board formed by non-metal material and the foil formed by metal material, form a multi-layer structure.

The mounting frame may be configured at a front end of a front side of the support board, and the support portion may be configured at a rear end of the front side of the support board.

The foil may cover the total area of the mounting frame at the front end, and extend to contact the main board at the rear end.

The mounting frame may have a same height and size with the display screen.

The mounting frame may further comprise a loudspeaker audio cavity for receiving a loudspeaker; wherein the loudspeaker audio cavity may be configured in the front of the mounting frame and has a same height with the mounting frame.

The support portion may be provided with openings reserved for devices of the main board that contact with outside; the openings may comprise openings for a battery connector, a Subscriber Identity Module (SIM) card holder and a dock connector of the main board.

The support board may further comprise a fixing frame at a back side of the support board, the fixing frame is configured to fix components outside of the main board; the fixing frame may be configured as a groove; the components outside of the main board may comprise a loudspeaker fixing frame for a loudspeaker and a vibration motor fixing frame for a vibration motor.

The support board may further comprise a passage groove configured to fix wires connecting the components outside of the main board with the main board.

The support board of the disclosure mainly includes the mounting frame for fixing the display screen and the support portion for supporting the main board having the broken-board structure. The support board is formed by non-metal material, and the foil formed by metal material is provided in a portion of the mounting frame which contacts the display screen surrounded by the mounting frame. The support board formed by non-metal material and the foil formed by metal material form the multi-layer structure. By applying the support board, the manufacturing cost of a mobile phone can be reduced and the design requirements of low cost mobile phones such as bar phones can be satisfied.

DETAILED DESCRIPTION

Figure 1:
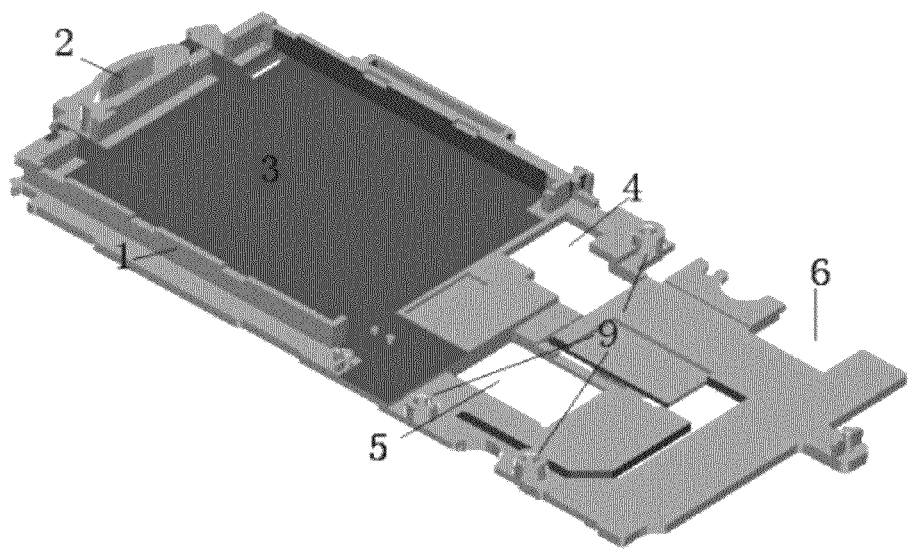
FIG. 1 is a schematic diagram illustrating a front spatial structure of a support board in the disclosure.

The basic idea of the disclosure is that: a support board mainly includes a mounting frame for fixing a display screen and a support portion for supporting a main board having a broken-board structure. The support board is formed by non-metal material. A foil formed by metal material is provided in a portion of the mounting frame for fixing the display screen which contacts the display screen surrounded by the mounting frame. The support board formed by non-metal material and the foil formed by metal material form a multi-layer structure.

The implementation of the technical solution is further described below in details with reference to the drawings.

A support board used in a mobile phone with a main board having a broken-board structure mainly includes the following content:

the support board is shaped as a flat plate. When the main board having a broken-board structure in the mobile phone is supported on the support board, the main board having the broken-board structure in the mobile phone needs to occupy one part of the area of the support board, which is different from a mobile phone main board which needs to occupy the area of the whole mobile phone in an existing technology, i.e., the total area of the support board of the mobile is occupied, thus the support board applicable to the main board with the broken-board structure of the disclosure is different from the existing technology and reduces the manufacturing cost of the mobile phone.

Corresponding to the main board having the broken-board structure in the mobile phone, when a display screen of a mobile phone is supported on the support board, the display screen of the mobile phone needs to occupy the other part of the area of the support board. In other words, the support board mainly includes a mounting frame for fixing a display screen and a support portion for supporting the main board having the broken-board structure. The mounting frame for fixing the display screen is configured at the front end of the support board, and the support portion for supporting the main board having the broken-board structure is configured at the rear end of the support board, wherein the mounting frame for fixing the display screen is formed by non-metal material; a foil formed by metal material is added into a portion of the mounting frame for fixing the display screen which contacts the display screen surrounded by the mounting frame. The support board formed by non-metal material and the foil formed by metal material form a multi-layer structure.

It must be pointed out that the foil in the portion of the mounting frame for fixing the display screen which contacts the display screen surrounded by the mounting frame not only covers the total area of the mounting frame for fixing the display screen, but also extends to contact the main board having the broken-board structure at the rear end. In addition, the foil can be thickened properly to contact the main board having the broken-board structure at the rear end. The multi-layer structure is obtained after the foil is added, which has the following advantages compared with the existing technology: the multi-layer structure with the foil is not added into the existing technology, or only the metal material is applied in the existing technology, which causes the problem of high cost; or only the non-metal material is applied, which reduces the cost, but causes the problem of bad electromagnetic shielding effect. Because the foil extends to contact the main board having the broken-board structure, the disclosure which applies the multi-layer structure is able to improve the radio frequency performance of the mobile phone in an extensible manner while preventing radiation interference of the display screen to other parts with the evidently-improved electromagnetic shielding effect. In addition, the design of the disclosure which is not formed by metal material only will certainly reduce the cost.

Further, the mounting frame for fixing the display screen has a same height and size with the display screen.

Further, a loudspeaker audio cavity for receiving a loudspeaker is configured in the front of the mounting frame for fixing the display screen, and has a same height with the mounting frame for fixing the display screen, Further, the support portion are provided with openings reserved for devices of the main board that contact with outside; the openings include openings for a battery connector, a Subscriber Identity Module (SIM) card holder, and a dock connector of the main board. Different from the existing technology, such arrangement has the following advantages: generally, the devices of the main board that contact with outside are relatively high. The height of the main board with the broken-board structure will be increased inevitably and imperceptibly when the devices of the main board contact with outside if openings are not reserved, thus the main board with the broken-board structure is higher than the display screen. The display screen must be also heightened so that the mounting frame has the same height with the display screen, which thickens the whole mobile phone imperceptibly. The openings reserved in the disclosure can prevent the main board with the broken-board structure from being heightened by the addition of the higher devices above so that the main board having the broken-board structure has the same height with the display screen, and the thickness of the whole mobile phone will not be increased imperceptibly. In other words, the support board of the disclosure is able to support the main board having the broken-board structure and the display screen on the same plane.

Further, besides the mounting frame for fixing the display screen at the front end of the support board and the support portion for supporting the main board having the broken-board structure, the support board further includes a fixing frame at the back side of the support board, the fixing frame is configured to fix components outside of the main board, and the fixing frame is configured as a groove, wherein the components outside of the main board includes a loudspeaker and a vibration motor, and a loudspeaker fixing frame and a vibration motor fixing frame are configured at the back side of the support board. Both the loudspeaker fixing frame and the vibration motor fixing frame can be designed as the groove.

Further, the support board further includes a passage groove configured to fix wires connecting the components (such as a loudspeaker and a vibration motor) outside of the main board with the main board.

Further, the support board can be formed by non-metal material with a relatively low cost.

To sum up, the disclosure has the following major advantages:

1: the support board of the disclosure is designed for a main board having a broken-board structure in a low cost mobile phone such as a bar phone. The support board is formed by non-metal material and the foil is configured at the display screen frame at the same time, which extends the radio frequency while effectively shielding the electromagnetic radiation of the display screen. Through the design above, the disclosure solves the problem of relatively bad electromagnetic shielding effect when the main board having the broken-board structure is supported. In addition the cost is lower compared with a support board formed by metal material. Moreover, better radio frequency performance of the mobile phone can be achieved, and the design requirements of low cost mobile phones can be better satisfied.

2: according to the characteristics of the main board having the broken-board structure, the rear end of the support board of the disclosure is designed with openings so as to support the main board and the display screen on the same plane, thus reducing the thickness of the mobile phone so that the mobile phone is smaller and more beautiful.

3: the support board of the disclosure is designed with the groove to fix the components such as the loudspeaker, and the vibration motor etc. besides the main board, and a passage groove is provided to fix wires connecting the components outside of the main board with the main board. Therefore, the problems of infirm connection and easy detachment between the components outside of the main board and the main board are solved to improve the solidity of the whole structure of the mobile phone.

Thus, the support board of the disclosure is applicable to the main board having a broken-board structure in a mobile phone, and is able to support various components such as the main board having the broken-board structure, the display screen, the loudspeaker, and the vibration motor etc. In addition, based on the characteristics of low cost mobile phones with the main board having a broken-board structure, the multi-layer structure formed by non-metal material and metal material is applied to reduce the manufacturing cost without influencing the shielding performance.

Examples are given below to describe the disclosure.

Figure 2:
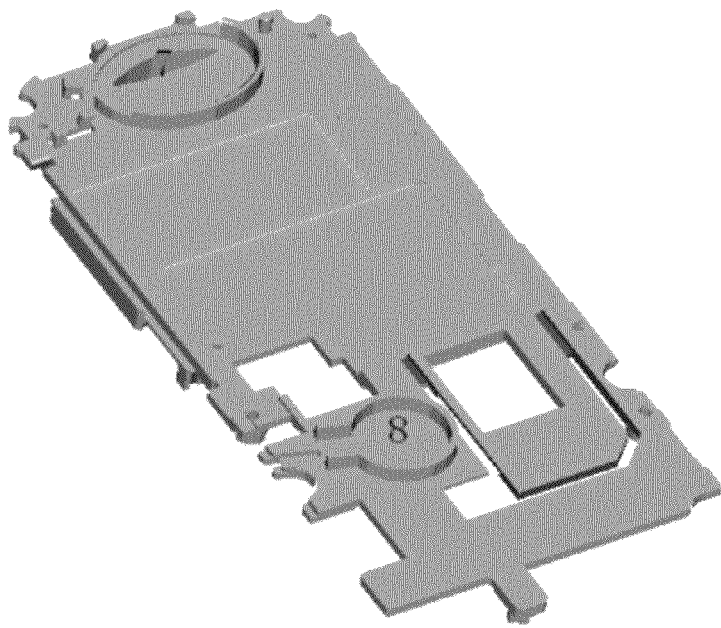
FIG. 2 is a schematic diagram illustrating a back spatial structure of a support board in the disclosure.

The outline structure of the support board of the disclosure is as shown in FIG. 1 and FIG. 2, and the support board is formed by non-metal material such as plastic material. The support board is shaped as a rectangle applied to a bar phone.

As shown in FIG. 1, viewed from the front side of the support board of the disclosure, the front end of the support board is designed with a mounting frame 1 for fixing a display screen. The mounting frame 1 for fixing the display screen has the same height and size with the display screen. A loudspeaker audio cavity 2 for receiving a loudspeaker is configured at the upper portion of the mounting frame 1. The loudspeaker audio cavity 2 has the same height with the mounting frame 1 for fixing the display screen, which is able to effectively improve the audio effect of the loudspeaker. A foil 3 is provided in a portion of the mounting frame 1 which contacts the display screen surrounded by the mounting frame. The foil 3 covers the total installation area of the display screen and extends to contact a main board having a broken-board structure at the rear end. The foil 3 is heightened properly so as to contact the main board having the broken-board structure at the rear end. The foil 3 is one of the key points in the design of the support board, which can improve the radio frequency performance of the mobile phone in an extensible manner while preventing radiation interference of the display screen to other parts with the evidently-improved electromagnetic shielding effect. The rear end of the support board is a support portion for supporting the main board having the broken-board structure. Openings, e.g. a battery connector opening 4, an SIM card holder opening 5 and a dock connector opening 6, are reserved for devices of the main board that contact with outside. FIG. 2 further includes screw holes 9 and there are three screw holes 9 for assembling the support board and the main board with the broken-board structure.

As shown in FIG. 2, viewed from the back of the support board of the disclosure, the support board further includes a fixing frame at the back side of the support board, the fixing frame is configured to fix components outside of the main board, e.g. a loudspeaker fixing frame 7 and a vibration motor fixing frame 8, wherein a passage groove configured to fix wires is reserved between the loudspeaker fixing frame 7 and the vibration motor fixing frame 8. A passage groove configured to fix wires is also reserved between the vibration motor fixing frame 8 and the main board. Such design enables the whole mobile phone component to be fixed on the support board so that the structure of the whole mobile phone is firmer, and the mobile phone can be assembled more conveniently.

Figure 3:
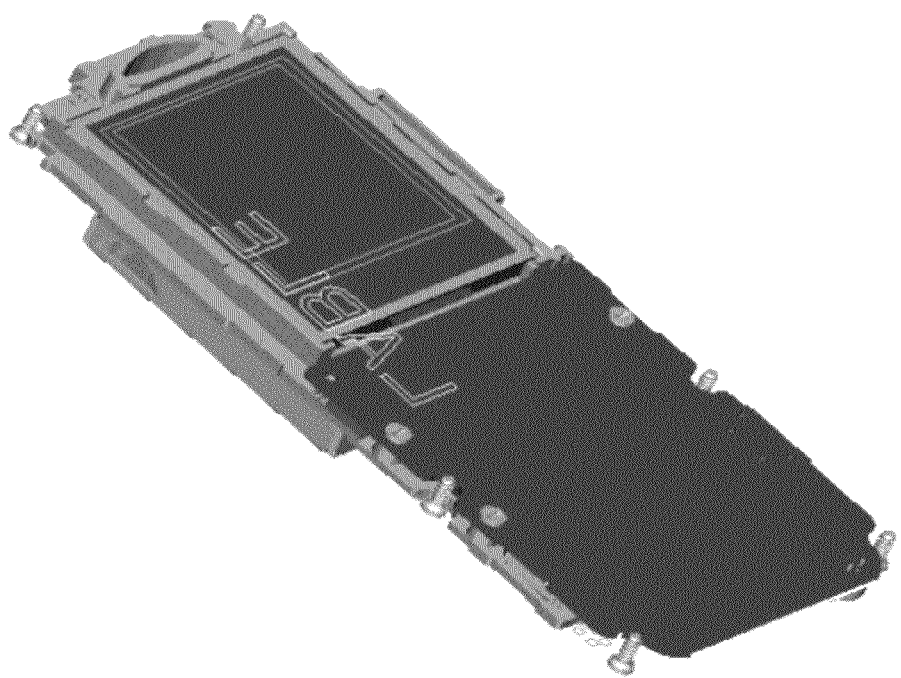
FIG. 3 is a structural diagram illustrating assembly of a support board and a main board having a broken-board structure in the disclosure.

As shown in FIG. 3, when the main board having the broken-board structure is supported on the support board of the disclosure, the main board includes a shielding bracket and the display screen are right on the same plane. The support board is fixed with the main board by three screws. The screw holes 9 are configured at the edge of the rear end of the support board. When the support board is assembled with the main board, the display screen is clamped into the mounting frame 1 for fixing the display screen first, and then the main board is fixed with the rear end of the support board. The screw holes 9 are aligned with the corresponding openings on the main board. Subsequently, a loudspeaker and a vibration motor are placed in the loudspeaker fixing frame 7 and the vibration motor fixing frame 8 at the back of the support board. Finally, the three screws are installed on the three corresponding screw holes 9, respectively to fix the main board and components thereof to the support board eventually.

The above are only preferred embodiments of the disclosure and should not be used to limit the scope of protection of the disclosure.

What is claimed is:

1. A support board used in a mobile phone with a main board having a broken-board structure, wherein the support board comprises a mounting frame for fixing a display screen and a support portion for supporting the main board having the broken-board structure;
   wherein the support board is formed by non-metal material;
   wherein a foil formed by metal material is provided in a portion of the mounting frame which contacts the display screen surrounded by the mounting frame;
   wherein the support board formed by non-metal material and the foil formed by metal material, form a multi-layer structure,
   wherein the mounting frame is configured at a front end of a front side of the support board, and the support portion is configured at a rear end of the front side of the support board.

2. The support board according to claim 1, wherein the foil covers the total area of the mounting frame at the front end, and extends to contact the main board at the rear end.

3. The support board according to claim 2, wherein the mounting frame has a same height and size with the display screen.

4. The support board according to claim 2, wherein the mounting frame further comprises a loudspeaker audio cavity for receiving a loudspeaker;
   wherein the loudspeaker audio cavity is configured in the front of the mounting frame and has a same height with the mounting frame.

5. The support board according to claim 2, wherein the support portion is provided with openings reserved for devices of the main board that contact with outside; the openings comprise openings for a battery connector, a Subscriber Identity Module (SIM) card holder and a dock connector of the main board.

6. The support board according to claim 2, wherein the support board further comprises a fixing frame at a back side of the support board, the fixing frame is configured to fix components outside of the main board; the fixing frame is configured as a groove;
   the components outside of the main board comprise a loudspeaker fixing frame for a loudspeaker and a vibration motor fixing frame for a vibration motor.

7. The support board according to claim 6, wherein the support board further comprises a passage groove configured to fix wires connecting the components outside of the main board with the main board.

* * * * *